United States Patent
Lilja et al.

(10) Patent No.: US 7,136,667 B2
(45) Date of Patent: Nov. 14, 2006

(54) METHOD AND RADIO TERMINAL EQUIPMENT ARRANGEMENT FOR POWER CONTROL, RADIO TERMINAL EQUIPMENT AND SECONDARY TERMINAL UNIT

(75) Inventors: Antti Lilja, Oulunsalo (FI); Mika Maarala, Oulu (FI)

(73) Assignee: Nokia Corporation, Espoo (FI)

( * ) Notice: Subject to any disclaimer, the term of this patent is extended or adjusted under 35 U.S.C. 154(b) by 451 days.

(21) Appl. No.: 10/695,072

(22) Filed: Oct. 28, 2003

(65) Prior Publication Data

US 2005/0090211 A1    Apr. 28, 2005

(51) Int. Cl.
  *H04B 7/00*    (2006.01)
  *H04B 1/00*    (2006.01)
  *H04Q 7/20*    (2006.01)

(52) U.S. Cl. ............... 455/522; 455/41.2; 455/69

(58) Field of Classification Search ........... 455/522, 455/419, 69, 41.2, 67.11, 421, 422.1, 575.6, 455/575.9, 569.1, 115.1
See application file for complete search history.

(56) References Cited

U.S. PATENT DOCUMENTS

| | | | | |
|---|---|---|---|---|
| 4,636,741 A | * | 1/1987 | Mitzlaff | 330/127 |
| 4,989,260 A | * | 1/1991 | Meade | 455/95 |
| 5,999,832 A | * | 12/1999 | Vannatta et al. | 455/575.1 |
| 6,029,074 A | * | 2/2000 | Irvin | 455/571 |
| 6,853,851 B1 | * | 2/2005 | Rautiola et al. | 455/553.1 |

FOREIGN PATENT DOCUMENTS

EP    0 390 360 A2  *  3/1990

OTHER PUBLICATIONS

3GPP, Bluetooth Specification, Version 1.1, Feb. 22, 2001, p. 21-22.

* cited by examiner

*Primary Examiner*—Sonny Trinh
(74) *Attorney, Agent, or Firm*—Hollingsworth & Funk, LLC

(57) ABSTRACT

The invention relates to radio terminal equipment arrangement comprising radio terminal equipment and one or more secondary terminal units, the radio terminal equipment being configured to communicate with the one or more secondary terminal units by using wireless low-power radio frequency (LPRF) connections, and to use a predetermined transmitter power class. The radio terminal equipment is further configured to detect a change in a usage environment of the radio terminal equipment; and to change the transmitter power class of the radio terminal equipment based on the changed usage environment of the radio terminal equipment.

22 Claims, 3 Drawing Sheets

METHOD AND RADIO TERMINAL EQUIPMENT ARRANGEMENT FOR POWER CONTROL, RADIO TERMINAL EQUIPMENT AND SECONDARY TERMINAL UNIT

BACKGROUND OF THE INVENTION

1. Field of the Invention

The invention relates to a method of power control, to a radio terminal equipment arrangement, to radio terminal equipment and to a secondary terminal unit.

2. Description of the Related Art

Mobile devices divided into several parts that are used in various combinations are being developed. Multipart radio terminals, for example, may include a cellular core unit and a number of optimized peripheral units. The peripheral units of the multipart radio terminals are optimized for specific tasks and all the peripheral units are connected to a core unit by low-power radio frequency (LPRF) connections, such as Bluetooth connections. One of the peripheral units may be optimized for making basic phone calls and another peripheral unit may be optimized for messaging and browsing or for imaging and music, for example. Typical mobile phones may also comprise several enhancement devices, such as headsets, pens, and web pads that communicate with the mobile phone over wireless connections.

The core unit and the peripheral units of the multipart radio terminals use predetermined transmit power classes. The Bluetooth power classes are described in the Third Generation Partnership Project; Bluetooth Specification, Version 1.1, 22 Feb. 2001, p. 21 of 1084. Typically, in a mobile environment, the core unit and the peripheral units are short range LPRF equipment. Bluetooth power class 2 is meant to be used in close-range areas, where the distance between the core unit and the peripheral units is between 0 to 10 meters. Bluetooth power class 1 is meant to be used in long-range areas, where the distance between the core unit and the peripheral units is between 10 to 100 meters. Usually, however, the range between the core unit and the peripheral units is about one meter. It would thus be a waste of power to have power class 1 equipment in multipart terminals at all times. Further, more restrictions for using power class 1 are met in form of regulatory requirements due to radiation towards the human body, for example. However, in home environments, for example, the core unit may be very far away from the peripheral units, and more output power would be required to maintain a good link quality between the devices. A user of the multipart device may not wish to carry the core unit along all the time but still carries the peripheral unit(s) with him/her. This increases Bluetooth link distances and causes connection and data transfer problems with power class 2.

SUMMARY OF THE INVENTION

According to an embodiment of the invention, there is provided a method of power control in a radio terminal equipment arrangement, the method comprising communicating, by radio terminal equipment, with one or more secondary terminal units of the radio terminal equipment arrangement by using a low power radio frequency (LPRF) connection, the radio terminal equipment arrangement using a predetermined transmitter power class, the method comprising detecting a change in a usage environment of the radio terminal equipment; and changing the transmitter power class of the radio terminal equipment based on the usage environment of the radio terminal equipment.

According to another embodiment of the invention, there is provided a radio terminal equipment arrangement comprising radio terminal equipment and one or more secondary terminal units, the radio terminal equipment being configured to communicate with the one or more secondary terminal units by using wireless low-power radio frequency (LPRF) connections, and to use a predetermined transmitter power class. The radio terminal equipment is further configured to detect a change in a usage environment of the radio terminal equipment and to change the transmitter power class of the radio terminal equipment based on the changed usage environment of the radio terminal equipment.

According to another embodiment of the invention, there is provided radio terminal equipment being configured to communicate with one or more secondary terminal units in a radio terminal equipment arrangement by using wireless low-power radio frequency (LPRF) connections, and to use a predetermined transmitter power class. The radio terminal equipment comprises detecting means for detecting a change in a usage environment of the radio terminal equipment and power class changing means for changing the transmitter power class of the radio terminal equipment based on the changed usage environment of the radio terminal equipment.

According to yet another embodiment of the invention, there is provided a secondary terminal unit configured to communicate with radio terminal equipment of a radio terminal equipment arrangement by using wireless low-power radio frequency (LPRF) connections, and to use a predetermined transmitter power class. The secondary terminal unit comprises detecting means for detecting a change in a usage environment of the radio terminal equipment and adjusting means for adjusting the transmitter power of the secondary terminal unit based on the changed usage environment of the radio terminal equipment.

The embodiments of the invention provide several advantages. The optimum transmit power class is automatically used in all situations. The connection and data transfer quality is improved also in environments where the distance between the devices of the radio terminal equipment arrangement is long.

BRIEF DESCRIPTION OF THE DRAWINGS

In the following, the invention will be described in greater detail with reference to preferred embodiments and the accompanying drawings, in which.

DETAILED DESCRIPTION OF PREFERRED EMBODIMENTS

Figure 1:
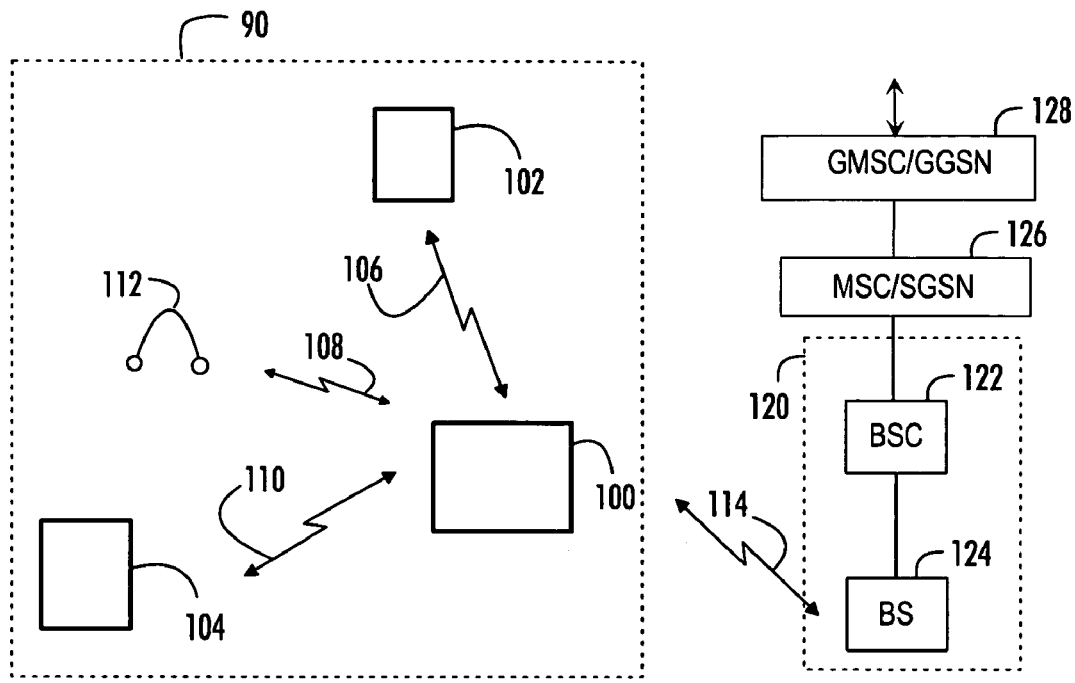
FIG. 1 shows an example of a structure of a radio system.

With reference to FIG. 1, let us examine an example of a radio system to which preferred embodiments of the invention can be applied. The radio system can be based on, for example, GSM (Global System for Mobile Communications), WCDMA (Wideband Code Division Multiple Access) or CDMA (Code Division Multiple Access).

A radio terminal equipment arrangement 90 in FIG. 1 comprises radio terminal equipment 100 and a number of secondary terminal units 102, 104, 112. The radio terminal equipment arrangement 90 is a multipart radio terminal equipment arrangement, for example. The radio terminal equipment 100, on the other hand, may be a core unit of the multipart radio terminal equipment arrangement, a typical mobile phone or a PDA (Personal Digital Assistant), for example. The secondary terminal unit 102, 104, 112 may be another mobile phone or any accessory device that is used with the mobile phone, such as a headset 112, a webpad, a wireless pen, a PDA device or a heart rate monitor. If the radio terminal equipment arrangement 90 is a multipart radio terminal, the secondary units 102, 104, 112 may be peripheral units communicating with the multipart radio terminal.

A cellular network may correspond to the combined structure of the GSM (Global System for Mobile Communications) and GPRS (General Packet Radio Service) systems, for example. GSM network elements are responsible for the implementation of circuit-switched connections, and GPRS network elements are responsible for the implementation of packet-switched connections, some of the network elements, however, being shared by both systems.

A centre 126 represents a mobile services switching centre (MSC) and a serving GPRS support node (SGSN) that enable circuit-switched and packet switched signalling, respectively, in the radio system. The cellular network may comprise a gateway unit 128, which is represented by a gateway mobile service switching centre (GMSC) and a gateway GPRS support node (GGSN). GMSC attends to the circuit-switched connections between the cellular network and external networks, such as a public land mobile network (PLMN) or a public switched telephone network (PSTN), and GGSN attends to the packet-switched connections between the cellular network and external networks, such as the Internet.

The centre 126 controls a radio access network (RAN) 120, which may comprise at least one base station controller 122 controlling at least one base station 124. The base station controller 122 can also be called a radio network controller, and the base station 124 can be called node B. The radio terminal equipment 100 of the radio terminal equipment arrangement 90 may communicate with at least one base station 124 over a radio interface.

The secondary terminal units 102, 104, 112 in the radio terminal equipment arrangement 90 may be optimized for specific tasks. One of the secondary terminal units is optimized for making basic phone calls and another secondary unit is optimized for messaging and browsing or for image processing and music, for example. Data may be stored in the secondary terminal unit's own databases. The secondary terminal units 102, 104, 112 communicate with the radio terminal equipment 100 with low-power radio frequency (LPRF) connections 106, 108, 110, such as Bluetooth or WLAN (Wireless Local Area Network) connections. The radio terminal equipment 100, on the other hand, is configured to communicate with other systems, such as the Internet, for example with LPRF connections and with GSM/GPRS/EDGE connections 114 as well. It is possible that the secondary terminal units 102, 104 also communicate with other systems with GSM/GPRS/EDGE connections, for example. It is also possible that the secondary units 102, 104 are configured to establish outside LPRF connections, such as WLAN connections, to other systems. Also, the radio terminal equipment 100 may establish connections between the secondary terminal units 102, 104 and other systems, such as the Internet or other radio terminals, via a cellular network by using a GSM or a GPRS/EDGE connection 114, for example.

Figure 2:
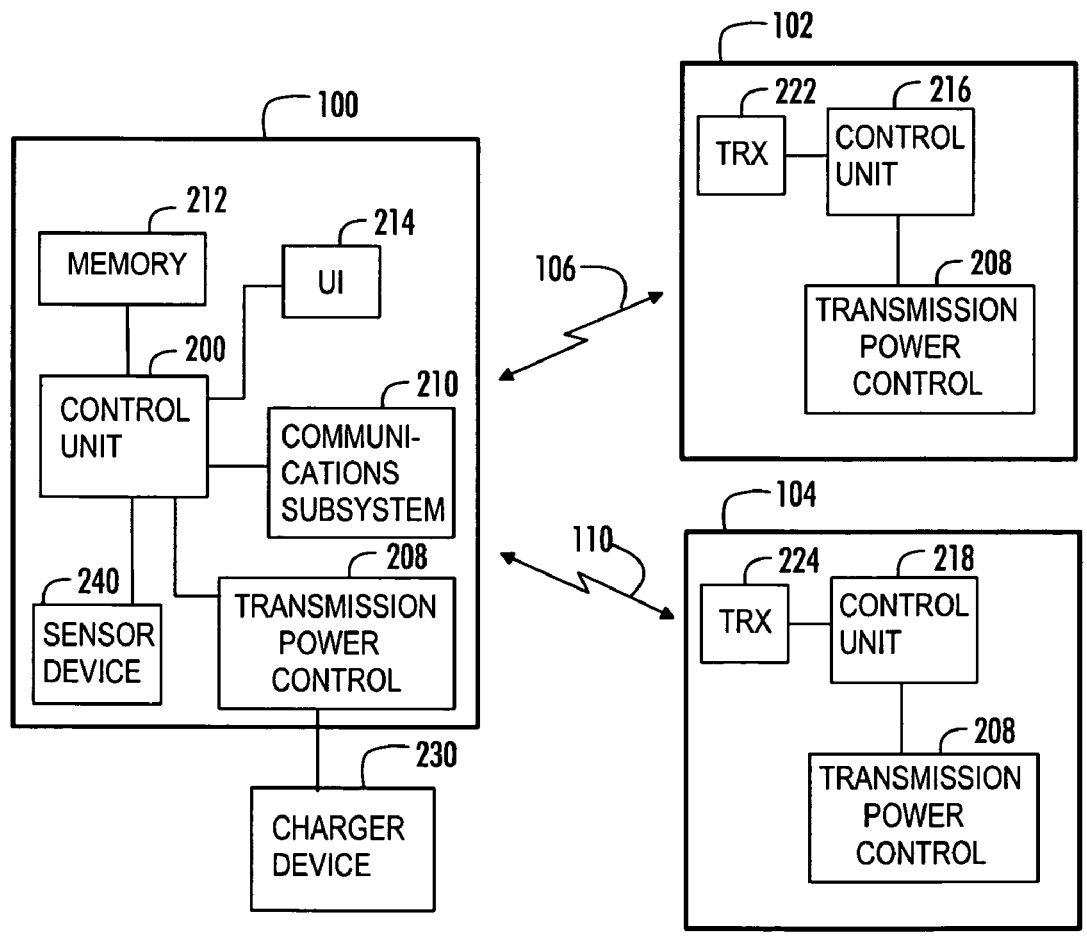
FIG. 2 shows an example of structures of radio terminal equipment and secondary terminal units.

An embodiment of the invention is generally described in FIG. 2. In the embodiment, the radio terminal equipment 100 comprises at least a control unit 200 for controlling the functions of the radio terminal equipment 100, and the radio terminal equipment 100 is configured to communicate with one or more secondary terminal units 102, 104 by using wireless low-power radio frequency (LPRF) connections 106, 110.

The radio terminal equipment 100 may also comprise the following elements: a power control changing means 208 for changing the transmission power class of the radio terminal equipment 100, a memory 212, a communications subsystem 210, a user interface 214, detecting means, such as a charging device 230 and a sensor device 240, for detecting changes in the usage environment of the radio terminal equipment 100. The secondary terminal units 102, 104 may comprise transmitter-receivers 222, 224 for communicating with the radio terminal equipment 100, control units 216, 218 for controlling the functions of the secondary units 102, 104, and adjusting means for adjusting the transmission power of the secondary terminal unit 208.

The control units 200, 216, 218 of the radio terminal equipment 100 and the secondary terminal units 102, 104 refer to blocks controlling the operation of the devices, and are nowadays usually implemented as a processor and soft-ware, but different hardware implementations are also feasible, e.g. a circuit built of separate logics components or one or more client-specific integrated circuits (Application-Specific Integrated Circuit, ASIC). A hybrid of these implementations is also feasible. The communications subsystem 210 controls the communication of the radio terminal equipment 100. The user interface 214 of the radio terminal equipment 100 is an interface via which the user can interact with the software of the radio terminal equipment 100 and with the secondary units 102, 104 as well. The user interface 214 may comprise a display. In addition, the user interface 214 may include a loudspeaker and a keypad part. Depending on the type of the device, there may be different user interface parts and a varying number of them.

The radio terminal equipment 100 and the secondary terminal units 102, 104 use a predetermined transmit power class. Typically, in a mobile environment, the radio terminal equipment 100 and the secondary terminal units 102, 104 use 0 dBm nominal transmit power, that is, they are power class 2 equipment. Bluetooth power class 2 is meant to be used in close-range areas, where the distance between the radio terminal equipment 100 and the secondary terminal units 102, 104 is between 0 to 10 meters. Bluetooth power class 1 is meant to be used in long-range areas, where the distance between the radio terminal equipment 100 and the secondary terminal units 102, 104 is between 10 to 100 meters. The Bluetooth output power in power class 1 may be 20 dBm, for example.

In an embodiment, the radio terminal equipment 100 is configured to detect a change in the usage environment of the radio terminal equipment 100 and to change the transmitter power class of the radio terminal equipment 100 based on the changed usage environment. The radio terminal equipment 100 may include detecting means for detecting such changes in the usage environment of the radio terminal equipment 100. Further, the one or more secondary terminal units 102, 104 of the radio terminal equipment arrangement may be configured to change the transmitter power class of the secondary terminal units based on the changed usage environment of the radio terminal equipment 100. It is possible that the power class of the one or more secondary terminal units 102, 104 is not changed, but the transmit power of the secondary terminal units 102, 104 may be adjusted instead. The change in the usage environment of the radio terminal equipment 100 may be detected based on detecting a connection between the radio terminal equipment 100 and the charging device 230, for example. Further, the change in the usage environment may be detected based on detecting a disconnection of the radio terminal equipment 100 from the charging device 230.

The transmitter power class of the radio terminal equipment 100 is changed based on the usage environment of the radio terminal equipment 100. If it is detected that the radio terminal equipment 100 is connected to a charger device 230, for example, the transmitter power class may be changed to a power class using higher power. For example, when the user of the radio terminal equipment 100 is in a home environment, the radio terminal equipment 100 does not have to be carried on the user all the time. The user of the radio terminal equipment 100 may then leave the device to a desk stand, which connects the radio terminal equipment 100 to a charger device 230. The radio terminal equipment 100 detects a connection that gives the radio terminal equipment 100 the information on the changed usage environment. If the radio terminal equipment 100 is connected to a charging device 230 or a desk stand, it most certainly will not be in the user's pocket or in any carrying means any more. However, the user may still carry the secondary terminal units 102, 104 with him or her. Thus, the transmitter power may be increased in order to prevent any connection or data transfer problems between the radio terminal equipment 100 and the secondary units 102, 104 due to the increased distances between the devices.

The radio terminal equipment 100 may give control commands to the secondary terminal units 102, 104 to change their power classes or transmit power levels also. The secondary terminal units 102, 104 may then start using another power class based on the information from the radio terminal equipment 100. It is also feasible that the power class of the secondary units 102, 104 is not changed if other power control means of the secondary units are used. The higher power used when the radio terminal equipment 100 is connected to the charging device 230, for example, does not affect the secondary terminal units 102, 104 operation times since the transmitted data load is low. When the radio terminal equipment 100 is on the desk stand or connected to the charging device 230, for example, Bluetooth power amplifier does not drain battery capacity because of the connection. Further, radiation would not be a problem since the radio terminal equipment 100 would not be near a human body.

In an embodiment of the invention, detecting means such as the sensor device 240 of the radio terminal equipment 100 may be used for detecting a predetermined distance between the radio terminal equipment 100 and a human body. Thus, the radio terminal equipment 100 is configured to detect the change in the usage environment based on the detected distance between the radio terminal equipment 100 and the human body by the sensor device 240. The sensor device 240 may be a proximity sensor detecting the closeness of a human body, for example. The sensor device 240 may also be any sensor that could be used to detect essential information about the user environment of the radio terminal equipment 100. The sensor device 240 may also be a coupling device carried on a user's belt, for example, to detect a connection between the radio terminal equipment 100 and the sensor device 240.

Figure 3:
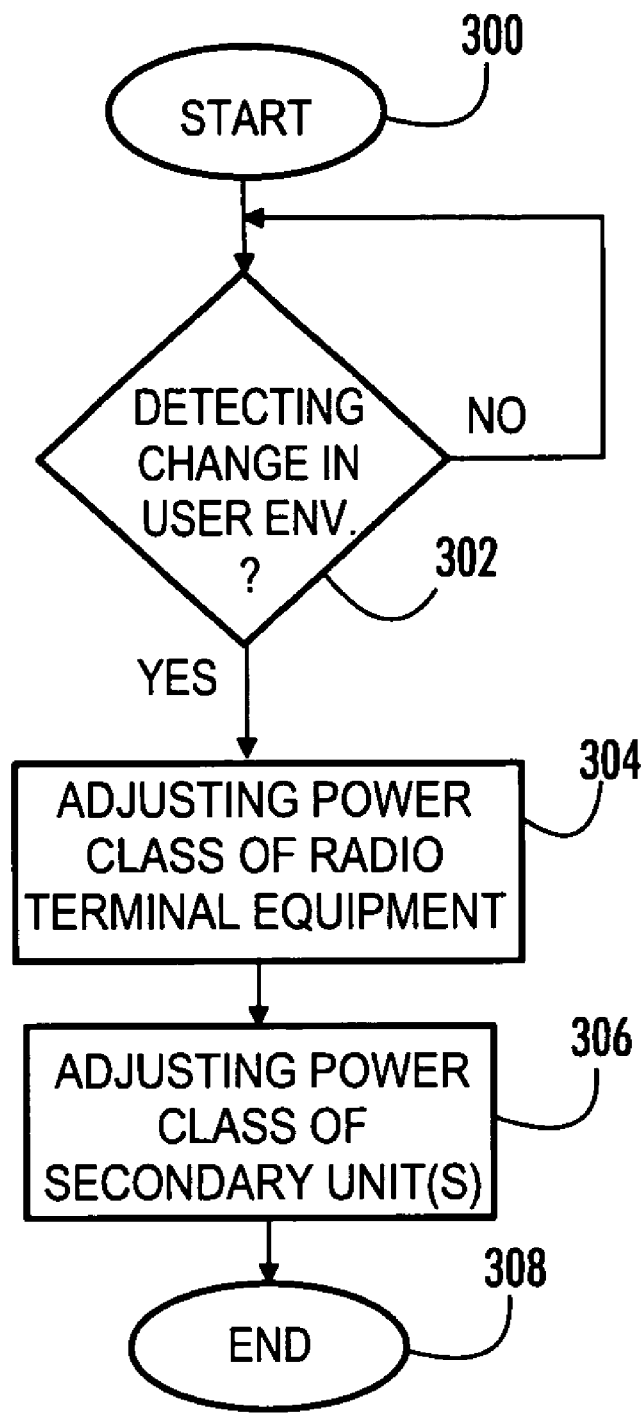
FIG. 3 shows an example of a method of power control in a radio terminal equipment arrangement.

FIG. 3 shows an example of a method of power control in a radio terminal equipment arrangement. The method starts in 300. In 302, it is detected whether any changes exist in the user environment of the radio terminal equipment. A change in the user environments may be detected when the radio terminal equipment is connected to a charging device, for example. Accordingly, disconnecting the radio terminal equipment from the charging device may result in detecting a change in the user environment of the radio terminal equipment.

If, in 302, a change in the user environment is detected, the process proceeds to 304 where the power class of the radio terminal equipment is adjusted. Let us assume that the power class of the radio terminal equipment and the secondary terminal units would be Bluetooth power class 2 at first. When operating in Bluetooth power class 2, the uplink and downlink nominal output powers are 0 dBm. Next, when the user environment changes, the power class of the radio terminal equipment is changed to Bluetooth power class 1, for example. In Bluetooth power class 1, the uplink and downlink output powers are 20 dBm, for example. The power class may be changed to a power class using a higher power level when the establishment of the connection between the radio terminal equipment and the charger device is detected. Accordingly, the power class is changed to a power class using a lower power level when the connection between the radio terminal equipment and the charging device ends.

In 306, the transmit power or the transmit power class of the one or more secondary terminal units may be adjusted based on the usage environment of the radio terminal equipment. It is possible that the radio terminal equipment sends a control command to the secondary terminal units to change their power class to be the same as the power class of the radio terminal equipment. Alternatively, the power class of the secondary terminal units is not changed if other power control means are used. The method ends in 308.

Figure 4:
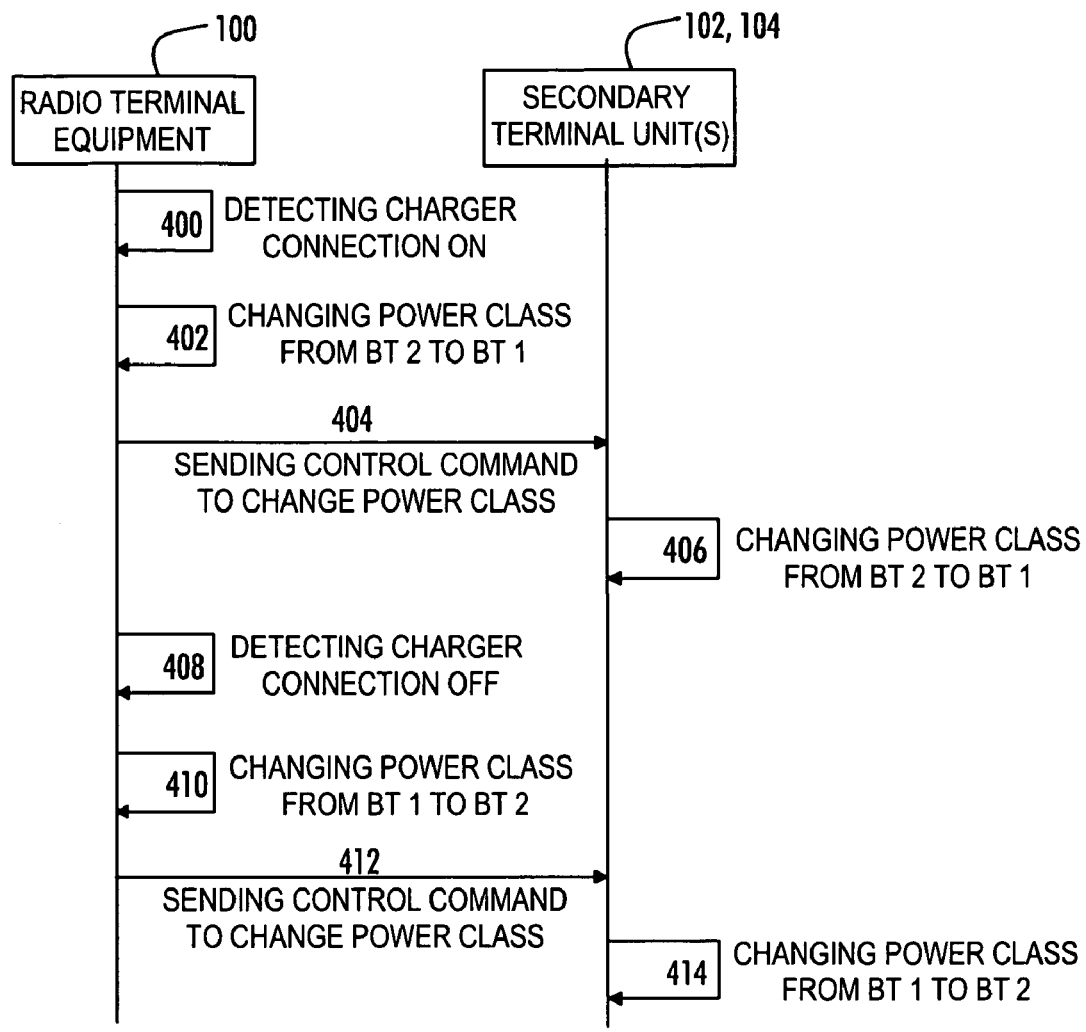
FIG. 4 shows another example of the method of power control in a radio terminal equipment arrangement.

Next, let us study the example of FIG. 4 of a method of power control in a radio terminal equipment arrangement. In FIG. 4, the first vertical line RADIO TERMINAL EQUIPMENT 100 denotes communication originating from radio terminal equipment and measures taken by the radio terminal equipment. The second vertical line SECONDARY TERMINAL UNIT 102, 104 denotes communication of the secondary terminal unit and measures taken by the secondary terminal unit.

At first, the power class of the radio terminal equipment and the secondary terminal unit is Bluetooth power class 2. In 400, it is detected in the radio terminal equipment that the connection between the radio terminal equipment and a charging device has been established. In 402, the power class of the radio terminal equipment is changed from Bluetooth power class 2 to Bluetooth power class 1. In 404, a control command for changing the power class of the secondary terminal unit may be sent from the radio terminal equipment to the secondary terminal unit. The secondary terminal unit may change its Bluetooth power class from 1 to 2 in 406. It is also possible that the power class of the secondary terminal units is not changed, depending on the system, if other means of power control are in operational.

Next, in 408, it is detected in the radio terminal equipment that the connection between the radio terminal equipment and the charging device ends. In 410, Bluetooth power class of the radio terminal equipment is changed from the Bluetooth power class 1 back to Bluetooth power class 2. Then, in 412, a control command for changing the power class of the secondary terminal unit is sent from the radio terminal equipment to the secondary terminal unit. Finally, in 414, the power class of the secondary terminal unit may be changed from Bluetooth power class 1 to Bluetooth power class 2.

Even though the invention has been described above with reference to an example according to the accompanying drawings, it is clear that the invention is not restricted thereto but can be modified in several ways within the scope of the appended claims.

We claim:

1. A method of power control in a radio terminal equipment arrangement, the method comprising communicating, by radio terminal equipment, with one or more secondary units of the radio terminal equipment arrangement by using a low power radio frequency (LPRF) connection, the radio terminal equipment arrangement using a predetermined transmitter power class, the method further comprising:
   detecting a change in a usage environment of the radio terminal equipment;
   changing the transmitter power class of the radio terminal equipment based on the usage environment of the radio terminal equipment; and
   sending a control command, by the radio terminal equipment, to one or more secondary units of the radio terminal equipment arrangement for changing the transmitter power or the transmitter power class of the secondary unit.

2. The method of claim 1, the method further comprising changing the transmitter power class of the one or more secondary units of the radio terminal equipment arrangement based on the usage environment of the radio terminal equipment.

3. The method of claim 1, the method further comprising establishing a connection between the radio terminal equipment and a charging device and detecting the change in the usage environment based on establishing a connection between the radio terminal equipment and the charging device.

4. The method of claim 3, the method further comprising changing the transmitter power class to a transmitter power class using a higher power level when the establishment of the connection between the radio terminal equipment and the charging device is detected.

5. The method of claim 3, the method further comprising ending a connection between the radio terminal equipment and a charging device and detecting a change in the usage environment based on the ended connection between the radio terminal equipment and the charging device.

6. The method of claim 5, the method further comprising changing the transmitter power class to a transmitter power class using a lower power level when the ending of the connection between the radio terminal equipment and the charging device is detected.

7. The method of claim 1, the method further comprising detecting a change in the usage environment based on detecting, by a sensor device, a predetermined distance between the radio terminal equipment and a human body.

8. The method of claim 1, wherein the transmitter power class is a Bluetooth power class.

9. The method of claim 1, wherein the LPRF connection is a Bluetooth, an infrared, or a WLAN connection.

10. A radio terminal equipment arrangement comprising radio terminal equipment and one or more secondary units, the radio terminal equipment being configured to communicate with the one or more secondary units by using wireless low-power radio frequency (LPRF) connections, and to use a predetermined transmitter power class, the radio terminal equipment further being configured to:
   detect a change in a usage environment of the radio terminal equipment;
   change the transmitter power class of the radio terminal equipment based on the changed usage environment of the radio terminal equipment; and
   send a control command to one or more secondary units of the radio terminal equipment arrangement to change the transmitter power or the transmitter power class of the secondary unit.

11. The radio terminal equipment arrangement of claim 10, the one or more secondary units of the radio terminal equipment arrangement further being configured to change the transmitter power or the transmitter power class of the secondary unit based on the usage environment of the radio terminal equipment.

12. The radio terminal equipment arrangement of claim 10, the radio terminal equipment further being configured to establish a connection between the radio terminal equipment and a charging device and to detect the change in the usage environment based on establishing a connection between the radio terminal equipment and a charging device.

13. The radio terminal equipment arrangement of claim 12, the radio terminal equipment further being configured to change the transmitter power class to a transmitter power class using a higher power level when the establishment of the connection between the radio terminal equipment and the charging device is detected.

14. The radio terminal equipment arrangement of claim 12, the radio terminal equipment being further configured to end a connection between the radio terminal equipment and a charger device, and to detect a change in the usage environment based on the ended connection between the radio terminal equipment and the charging device.

15. The radio terminal equipment arrangement of claim 14, the radio terminal equipment further being configured to change the transmitter power class to a transmitter power class using a lower power level when the ending of the connection between the radio terminal equipment and the charging device is detected.

16. The radio terminal equipment arrangement of claim 10, the radio terminal equipment comprising a sensor device being configured to detect a predetermined distance between the radio terminal equipment and a human body, and the radio terminal equipment being configured to detect a change in the usage environment based on the detected distance between the radio terminal equipment and the human body.

17. The radio terminal equipment arrangement of claim 10, wherein the radio terminal equipment and/or the one or more secondary units is/are a mobile station.

18. The radio terminal equipment arrangement of claim 10, wherein the radio terminal equipment and/or the one or more secondary units is/are a PDA (Personal Digital Assistant) device or a portable computer.

19. Radio terminal equipment configured to communicate with one or more secondary units in a radio terminal equipment arrangement by using wireless low-power radio frequency (LPRF) connections, and to use a predetermined transmitter power class, the radio terminal equipment comprising:
   detecting means for detecting a change in a usage environment of the radio terminal equipment;
   power class changing means for changing the transmitter power class of the radio terminal equipment based on the changed usage environment of the radio terminal equipment; and controlling means for sending a control command to one or more secondary units of the radio terminal equipment arrangement to change the transmitter power or the transmitter power class of the secondary unit.

20. The radio terminal equipment of claim 19, wherein the detecting means are configured to detect a change in the usage environment based on establishing a connection between the radio terminal equipment and a charging device.

21. The radio terminal equipment of claim 19, wherein the detecting means are configured to detect a change in the usage environment based on ending a connection between the radio terminal equipment and a charging device.

22. The radio terminal equipment of claim 19, wherein the detecting means are configured to detect a change in the usage environment based on detecting a predetermined distance between the radio terminal equipment and a human body.

* * * * *